United States Patent
Enokida et al.

(10) Patent No.: US 11,803,714 B2
(45) Date of Patent: Oct. 31, 2023

(54) LEARNING DEVICE, READER, AND LEARNING PROGRAM

(71) Applicant: Konica Minolta, Inc., Tokyo (JP)

(72) Inventors: Ippei Enokida, Tokyo (JP); Takumi Ishiwata, Tokyo (JP); Takeshi Hakii, Kanagawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 17/998,875

(22) PCT Filed: Apr. 2, 2021

(86) PCT No.: PCT/JP2021/014260
§ 371 (c)(1),
(2) Date: Nov. 15, 2022

(87) PCT Pub. No.: WO2021/240996
PCT Pub. Date: Dec. 2, 2021

(65) Prior Publication Data
US 2023/0196039 A1    Jun. 22, 2023

(30) Foreign Application Priority Data
May 25, 2020 (JP) ................ 2020-090737

(51) Int. Cl.
G06K 7/08 (2006.01)
G06K 19/067 (2006.01)

(52) U.S. Cl.
CPC ........... G06K 7/08 (2013.01); G06K 19/0672 (2013.01)

(58) Field of Classification Search
CPC ............... G06K 7/08; G06K 19/0672
See application file for complete search history.

(56) References Cited

U.S. PATENT DOCUMENTS

| | | | |
|---|---|---|---|
| 11,523,488 B1* | 12/2022 | Recker | H05B 47/105 |
| 2016/0187280 A1* | 6/2016 | Potyralio | G01N 31/10 324/675 |

(Continued)

FOREIGN PATENT DOCUMENTS

| | | |
|---|---|---|
| JP | 2001-134726 A | 5/2001 |
| JP | 2009-529724 A | 8/2009 |

(Continued)

OTHER PUBLICATIONS

JP2018041178A Learning Data Generation Method and Target Space State Recognition Method Employing The Same, 5 pages. (Year: 2023).*

(Continued)

*Primary Examiner* — Tuyen K Vo
(74) *Attorney, Agent, or Firm* — LUCAS & MERCANTI, LLP

(57) ABSTRACT

This learning device is provided with: a simulation execution unit that, by using electromagnetic field analysis simulation, determines a reflected wave spectrum obtained when electromagnetic waves are emitted from a reader to an identification target; and a machine learning unit that, by using training data in which the reflected wave spectrum calculated by the simulation execution unit and an attribute thereof are defined as a set, performs a training process on a learning model by machine learning. The simulation execution unit generates a plurality of the reflected wave spectra belonging to the same attribute by variously changing various parameters related to the identification target from reference parameters. The machine learning unit performs a training process on the learning model by machine learning by using, as training data, the plurality of reflected wave spectra obtained for each attribute.

20 Claims, 13 Drawing Sheets

(56) References Cited

U.S. PATENT DOCUMENTS

| | | | | |
|---|---|---|---|---|
| 2016/0290944 | A1* | 10/2016 | Potyrailo | G01N 27/026 |
| 2020/0118665 | A1* | 4/2020 | Bender | G16H 50/30 |
| 2020/0152328 | A1* | 5/2020 | Bender | G06N 20/00 |
| 2021/0211208 | A1* | 7/2021 | Wali | G01R 29/0857 |

FOREIGN PATENT DOCUMENTS

| | | |
|---|---|---|
| JP | 2010-238134 A | 10/2010 |
| JP | 2016-540190 A | 12/2016 |
| JP | 2018-041178 A | 3/2018 |
| JP | 2020-077776 A | 5/2020 |
| WO | 2018/218313 A1 | 12/2018 |

OTHER PUBLICATIONS

JP2010238134A Image Processor and Program, 7 pages. (Year: 2023).*

"PCT Notification of Transmittal of Translation of the International Preliminary Report on Patentability, PCT International Preliminary Report on Patentability, and Written Opinion", issued in connection with PCT/JP2021/014260, dated Dec. 8, 2022 (9 pages).

Md Aminul Islam and Nemai Chandra Karmakar, "Real-World Implementation Challenges of a Novel Dual-Polarized Compact Printable Chipless RFID Tag," IEEE Transactions on Microwave Theory and Techniques, vol. 63, No. 12, pp. 4581-4591, Dec. 2015.

Gotou, Masayuki and Kobayashi, Manabu, Introduction to pattern Analysis and Machine Learning, Corona Publishing Co.,Ltd, Apr. 30, 2014; ISBN 978-4-339-02479-1; 6 pages.

International Search Report for the corresponding patent application No. PCT/JP2021/014260 dated Jun. 15, 2021, with English translation.

\* cited by examiner

TABLE OF PARAMETERS TO BE CHANGED

| CONDUCTIVITY [10^-7 S/m] | DIELECTRIC CONSTANT | DIELECTRIC LOSS TANGENT | DISTANCE BETWEEN READER AND TAG [cm] |
|---|---|---|---|
| 3.77 | 1 | 0.0001 | 7 |
| 2.50 | 2 | 0.001 | 5 |
| 2.00 | 3 | 0.1 | 3 |
| 1.66 | 4 | 1 | 1 |

FIG. 13

LEARNING DEVICE, READER, AND LEARNING PROGRAM

CROSS REFERENCE TO RELATED APPLICATION

This Application is a 371 of PCT/JP2021/014260 filed on Apr. 2, 2021, which claimed priority of Japanese Application No. 2020-090737 filed May 25, 2020, both of which are incorporated herein by reference.

TECHNICAL FIELD

The present disclosure relates to a learning apparatus, a reader, and a learning program.

BACKGROUND ART

In recent years, with improved performance in processing of signals of high-frequency electromagnetic waves, various applications utilizing the electromagnetic waves have been studied.

For example, as a tag for commodity management that replaces a barcode or an electronic tag with a built-in IC chip, there is known a chipless-RFID tag that configures identification information by reflection characteristics when the chipless-RFID tag is irradiated with electromagnetic waves (for example, see Patent Literature (hereinafter referred to as "PTL") 1 and Non-Patent Literature (hereinafter referred to as "NPL") 1). In this type of chipless-RFID tag, for example, a plurality of resonators having resonance frequencies different from each other is formed on a base material of the tag, and identification information is expressed by a combination of the resonators. Then, the identification information included in the chipless-RFID tag is read, for example, by a reader as a resonance peak position appearing in a reflected wave spectrum of the chipless-RFID tag with respect to electromagnetic waves emitted from the reader.

Further, for example, there is known an RFID sensor as technology for detecting a state change in an object or an environment in a non-contact manner (for example, see PTLs 2 and 3). This type of RFID sensor includes, for example, a resonator physically associated with a state of a detection target, and is configured to detect a state change in the detection target from a change in a resonance frequency of the resonator. Then, the state change in the detection target detected by the RFID sensor is read by the reader as a change in a resonance peak position appearing in a reflected wave spectrum of the RFID sensor with respect to electromagnetic waves emitted from the reader.

A system that identifies identification information of a chipless-RFID tag or a state of a detection target detected by an RFID sensor by such an electromagnetic wave reflection characteristic of an identification target is also referred to as an "RFID system". Note that, hereinafter, the chipless-RFID tag and the RFID sensor will also be collectively referred to as an "identification target". Further, the identification information of the chipless-RFID tag or the state of the detection target detected by the RFID sensor will also be collectively referred to as an "attribute of the identification target".

CITATION LIST

Patent Literatures

PTL 1
Japanese Unexamined Patent Application Publication (Translation of PCT Application) No. 2009-529724

PTL 2
Japanese Patent Application Laid-Open No. 2001-134726
PTL 3
Japanese Patent Application No. 2020-077776

Non-Patent Literature

NPL 1
Md Aminul Islam and Nemai Chandra Karmakar, "Real-World Implementation Challenges of a Novel Dual-Polarized Compact Printable Chipless-RFID tag," IEEE TRANSACTIONS ON MICROWAVE THEORY AND TECHNIQUES, VOL. 63, NO. 12, pp. 4581-4591, DECEMBER 2015

SUMMARY OF INVENTION

Technical Problem

Note that, in a scene in which an identification target (a chipless-RFID tag or an RFID sensor) is actually used, unlike in an experimental environment, this type of RFID system may also be used under a situation in which the position or orientation of an identification target with respect to a reader varies for each reading, an object other than an identification target is present around the identification target, or an ambient environment (for example, temperature or humidity) of an identification target changes.

As a result of earnest investigation by the inventors of the present application, it has turned out that when an object around an identification target, an ambient environment of an identification target, or the position or orientation of an identification target changes as described above, a reflected wave spectrum (which means a frequency spectrum of a reflected wave; the same applies hereinafter) of the identification target may change and identification itself of the attribute of the identification target may become difficult.

In this type of RFID system, a technique called the peak picking method of estimating the attribute of an identification target by detecting a resonance frequency of a resonator included in the identification target from a reflected wave spectrum has been used in the related art. Under a situation in which a reflected wave spectrum has changed as described above, however, a technique of estimating the attribute of the identification target by using the peak picking method may generate erroneous identification.

An object of the present disclosure is therefore to provide a learning apparatus capable of constructing a learning model which is applied to attribute identification of an RFID system, has high robustness against various changes during actual use, and is capable of realizing identification performance with high accuracy. Further, an object of the present disclosure in another aspect is to provide a reader which utilizes the learning model. Further, an object of the present disclosure in another aspect is to provide a learning program for constructing the learning model.

Solution to Problem

A main aspect of the present disclosure for solving the above-described problems provides a learning apparatus of a learning model for performing attribute identification of an identification target, where the identification target indicates an attribute of the identification target by an electromagnetic wave reflection characteristic. The learning apparatus comprises:

a simulation execution section that determines, by using electromagnetic field analysis simulation, a reflected wave spectrum obtained when an electromagnetic wave is emitted from a reader to the identification target; and a machine learning section that performs training processing by machine learning on the learning model by using training data in which the reflected wave spectrum determined by the simulation execution section and the attribute of the identification target are configured as a set, where the attribute is attached to the reflected wave spectrum.

The simulation execution section generates a plurality of the reflected wave spectra by variously changing, from a reference parameter, at least one of a parameter defining a structure or a material of the identification target, a parameter defining a state of a surrounding environment of the identification target, and/or a parameter defining a measurement condition when the attribute of the identification target is estimated, where the plurality of reflected wave spectra is caused to belong to the attribute that is identical.

The machine learning section performs the training processing by the machine learning on the learning model by using, as the training data, the plurality of reflected wave spectra obtained for each of a plurality of the attributes.

Further, another aspect of the present disclosure for solving the above-described problems provides a reader that performs attribute identification of an identification target, where the identification target indicates an attribute of the identification target by an electromagnetic wave reflection characteristic. The reader comprises:

an acquisition section that emits an electromagnetic wave to the identification target and acquires a reflected wave spectrum of the identification target from a reflected wave of the electromagnetic wave; and an identification section that identifies, by using the learning model generated by the learning apparatus described above, the attribute of the identification target from the reflected wave spectrum acquired by the acquisition section.

Further, another aspect of the present disclosure for solving the above-described problems provides a learning program that performs training processing on a learning model for performing attribute identification of an identification target, where the identification target indicates an attribute of the identification target by an electromagnetic wave reflection characteristic. The learning program comprises:

first processing of determining, by using electromagnetic field analysis simulation, a reflected wave spectrum obtained when an electromagnetic wave is emitted from a reader to the identification target; and second processing of performing training processing by machine learning on the learning model by using training data in which the reflected wave spectrum determined by the first processing and the attribute of the identification target are configured as a set, where the attribute is attached to the reflected wave spectrum.

In the first processing, a plurality of the reflected wave spectra is generated by variously changing, from a reference parameter, at least one of a parameter defining a structure or a material of the identification target, a parameter defining a state of a surrounding environment of the identification target, and/or a parameter defining a measurement condition when the attribute of the identification target is identified, where the plurality of reflected wave spectra is caused to belong to the attribute that is identical.

In the second processing, the training processing by the machine learning is performed on the learning model by using, as the training data, the plurality of reflected wave spectra obtained for each of a plurality of the attributes.

Advantageous Effects of Invention

The learning apparatus according to the present disclosure makes it possible to construct a learning model which has high robustness against various changes during actual use and is capable of realizing identification performance with high accuracy.

BRIEF DESCRIPTION OF DRAWINGS

FIG. 13 illustrates examples of parameters to be changed by the simulation execution section according to the embodiment;

DESCRIPTION OF EMBODIMENTS

Hereinafter, preferred embodiments of the present disclosure will be described in detail with reference to the accompanying drawings. Note that, in the present description and the drawings, components having substantially the same function are denoted by the same reference signs to omit duplicated descriptions thereof.

《Configuration of RFID System》

First, an entire configuration of an RFID system according to an embodiment will be described with reference to FIGS. 1 and 2. In the present embodiment, an example in which a learning apparatus of the present disclosure is used in an application to generate a learning model for reading identification information of a chipless-RFID tag (hereinafter abbreviated to "tag") will be described.

Figure 1:
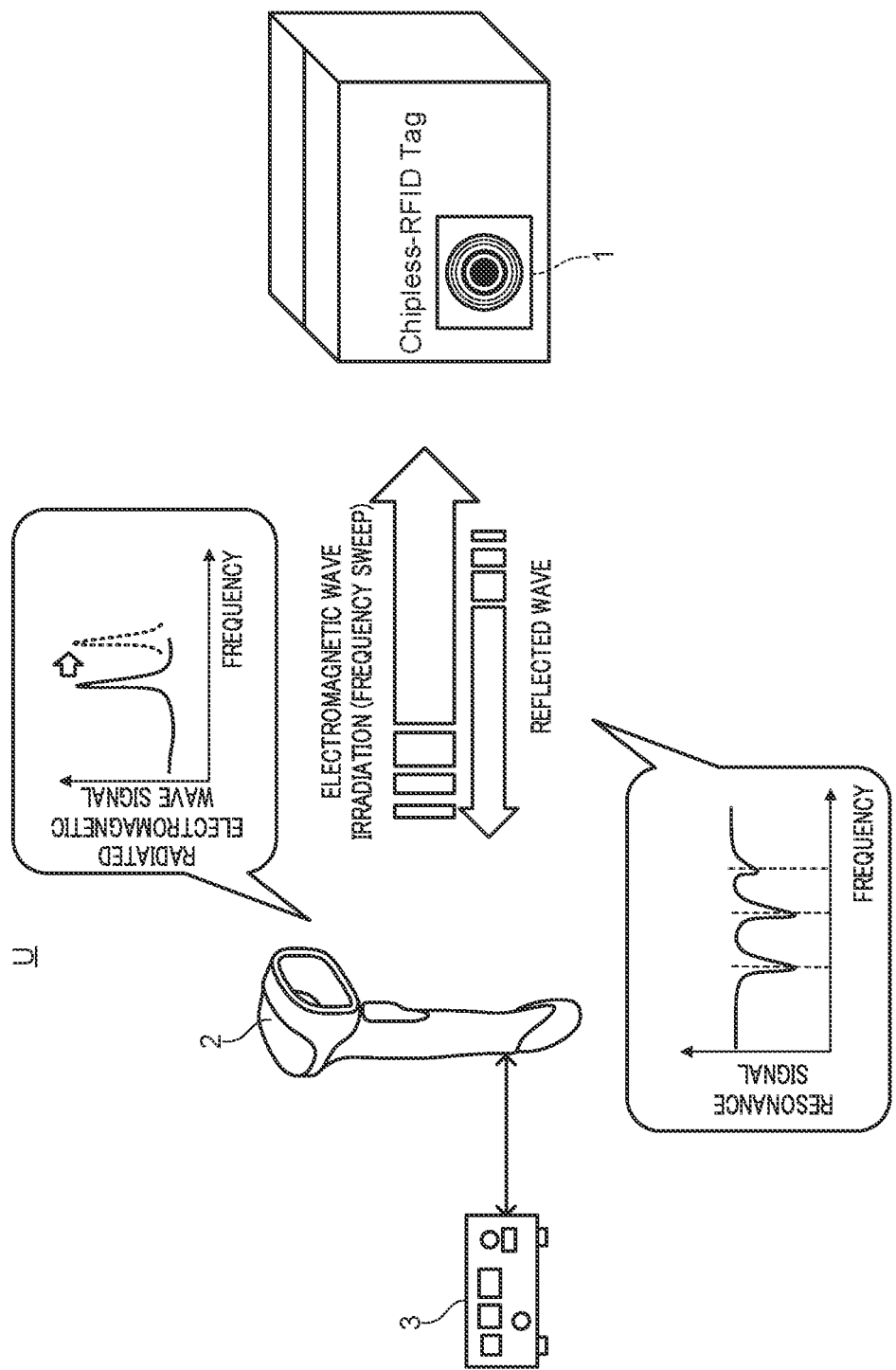
FIG. 1 illustrates an example of a configuration of an RFID system according to an embodiment.

FIG. 1 illustrates an entire configuration of RFID system U according to the present embodiment.

RFID system U according to the present embodiment includes: tag 1 that configures identification information by an electromagnetic wave reflection characteristic; reader 2 that transmits an electromagnetic wave to tag 1 and estimates, from a reflected wave spectrum thereof, identification information of tag 1; and learning apparatus 3 that generates learning model Da to be used by reader 2 when reader 2 estimates the identification information of tag 1.

RFID system U according to the present embodiment utilizes learning model Da on which machine learning has been performed and which has been already trained such that reader 2 can read identification information of tag 1 with high accuracy from a reflected wave spectrum of tag 1 even in a case where the position or orientation of tag 1 during actual use, an object around tag 1, a surrounding environment of tag 1, or the like differs from that in an experimental environment (details thereof will be described with reference to the drawings).

《Configuration of Tag》

Figure 2:
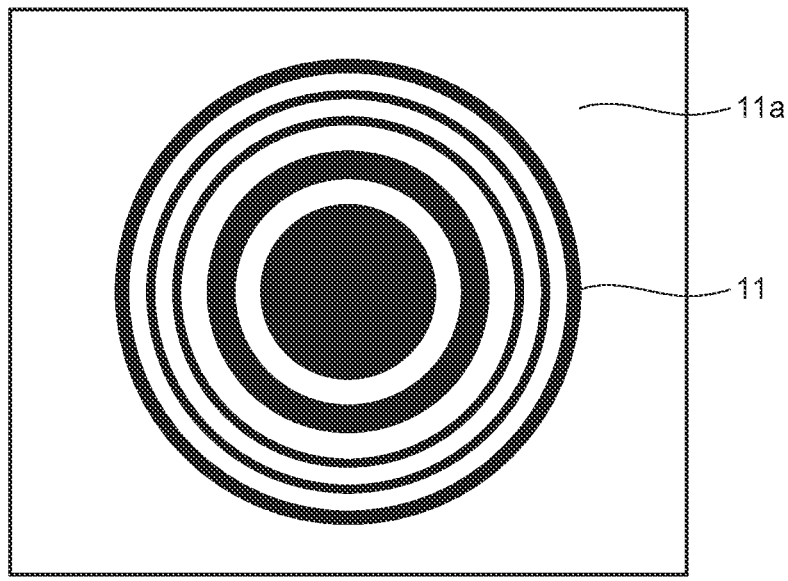
FIG. 2 is a plane view illustrating a configuration of a tag according to the embodiment.
Figure 3:
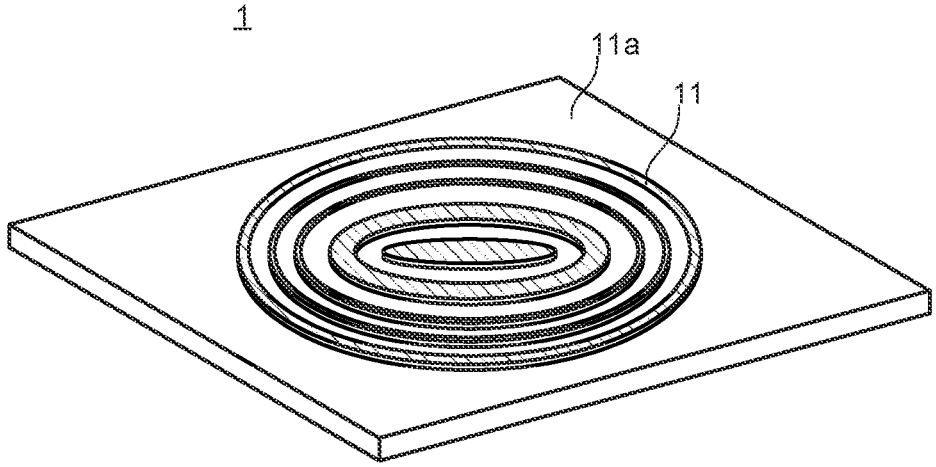
FIG. 3 is a perspective view illustrating the configuration of the tag according to the embodiment.

FIG. 2 is a plane view illustrating a configuration of tag 1 according to the present embodiment. FIG. 3 is a perspective view illustrating the configuration of tag 1 according to the present embodiment.

Tag 1 is not particularly limited as long as tag 1 is an object, and encompasses, for example, a cup, a logo, a mark, and the like, and is preferably an electromagnetic wave reflector. The electromagnetic wave reflector may be formed of, for example, a base material having a low electromagnetic wave reflectance and a metal ink printed on the base material, where a metal foil transferred to the base material or the like may also be used instead of the metal ink.

As illustrated in FIGS. 2 and 3, for example, tag 1 includes at least one (typically, two or more) resonator 11 configured by a conductor pattern formed on base material 11$a$. Resonator 11 resonates when resonator 11 is irradiated with an electromagnetic wave of a predetermined frequency, and absorbs or reflects the electromagnetic wave. The resonance frequency of resonator 11 is determined by the shape of resonator 11. Tag 1 according to the present embodiment includes four resonators 11 formed on a concentric circle, with circular rings whose ring lengths are different from each other, and with the shape of a circle. Note that, resonator 11 as such typically resonates when resonator 11 is irradiated with an electromagnetic wave and half the wavelength of the electromagnetic wave corresponds to the ring length of the circular ring or the circumferential length of the circle. That is, tag 1 in FIG. 2 is configured such that four resonance frequencies appear in a reflected wave spectrum by four resonators 11.

The shape of resonator 11 (the number and shape of resonators 11) is determined depending on identification information of tag 1. Further, the resonance frequency of tag 1 varies depending on the shape of resonator 11, and the reflected wave spectrum of tag 1 varies corresponding thereto.

In the present embodiment, identification information of tag 1 is expressed by a pattern of a reflected wave spectrum of tag 1. More specifically, the identification information of tag 1 is configured by resonator(s) 11 formed in tag 1 and is identifiable by an appearance aspect(s) of a resonance peak(s) (for example, the position(s) of the resonance peak(s), the number of resonance peaks, or an inter-peak interval among a plurality of resonance peaks) appearing in a reflected wave spectrum.

Figure 4:
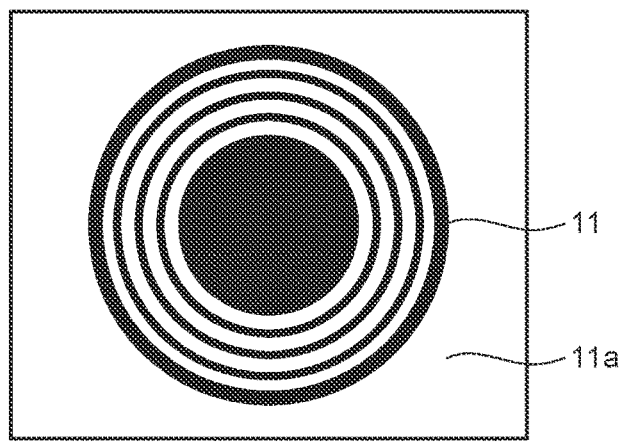
FIG. 4 illustrates an example of the tag including identification information different from that in the tag in FIG. 2.

FIG. 4 illustrates an example of tag 1 including identification information different from that in tag 1 in FIG. 2. In the same manner as tag 1 in FIG. 2, tag 1 in FIG. 4 includes resonators 11 in the shape of a circular ring, but the number and thicknesses of resonators 11 formed on base material 11$a$ differ from those in tag 1 in FIG. 2.

Figure 5:
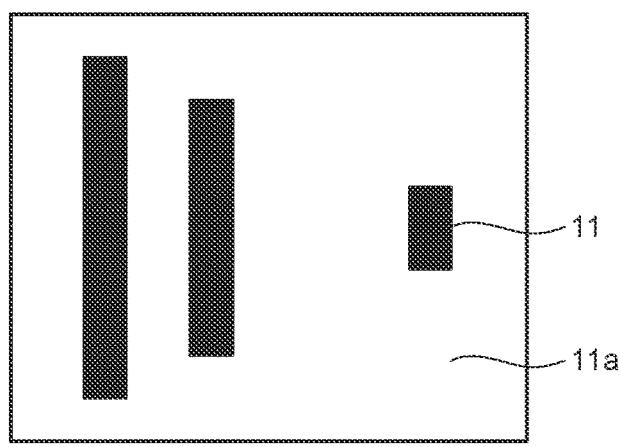
FIG. 5 illustrates an example of the tag including resonators having shapes different from those in the tag in FIG. 2.

FIG. 5 illustrates an example of tag 1 including resonators 11 having shapes different from those in tag 1 in FIG. 2. Tag 1 in FIG. 5 includes three resonators 11 formed by strip conductors. Three resonators 11 differ in length from each other, and tag 1 in FIG. 5 is configured such that three resonance frequencies appear in a reflected wave spectrum by three resonators 11.

Figure 6:
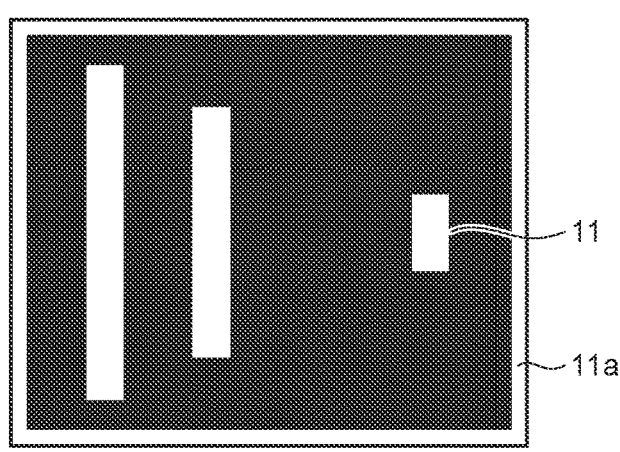
FIG. 6 illustrates another example of the tag including resonators having shape different from those in the tag in FIG. 2.

FIG. 6 illustrates another example of tag 1 including resonators having shape different from those in tag 1 in FIG. 2. Tag 1 in FIG. 6 includes three resonators 11 formed by slots which are formed so as to cut out a solid conductor layer.

Note that, as resonator 11 included in tag 1, a U-shaped resonator or the like may also be used (see NPL 1). Further, the shape of resonator 11 is not limited to a geometric shape, and characters or motif pattern may also be used.

Subsequently, the reflected wave spectrum of tag 1 will be described.

Figure 7:
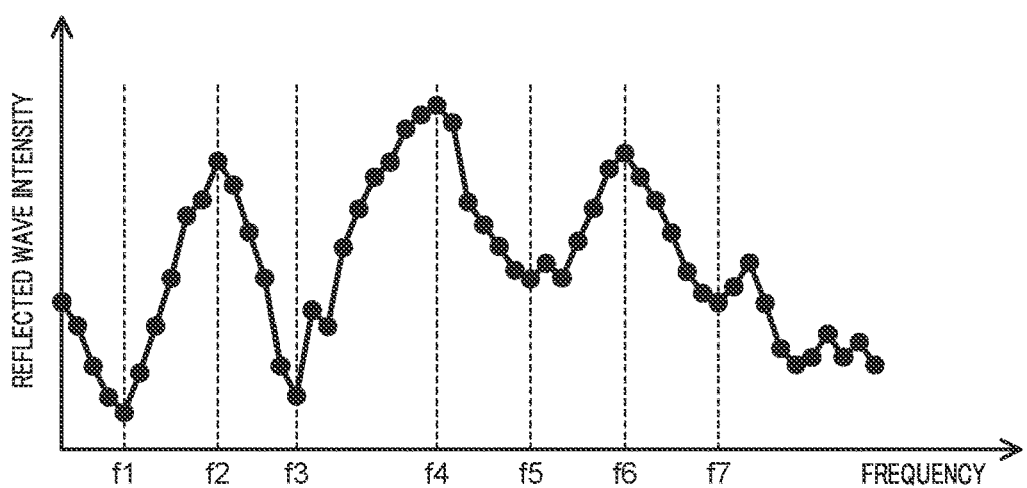
FIG. 7 is a diagram (1) illustrating a reflected wave spectrum of the tag according to the embodiment.

FIG. 7 is a diagram (1) illustrating a reflected wave spectrum of tag 1 according to the present embodiment. The vertical axis indicates the intensity ratio between a transmission wave emitted from reader 2 and a reflected wave from tag 1. Valleys of the intensity ratio appears at frequencies f1, f3, f5, and f7. A technique in the related art acquires identification information of tag 1 by estimating frequencies that form the above-mentioned valleys. Another technique in the related art acquires the identification information by focusing on the peaks appearing at frequencies f2, f4, and f6 (frequencies that form peaks).

Figure 8:
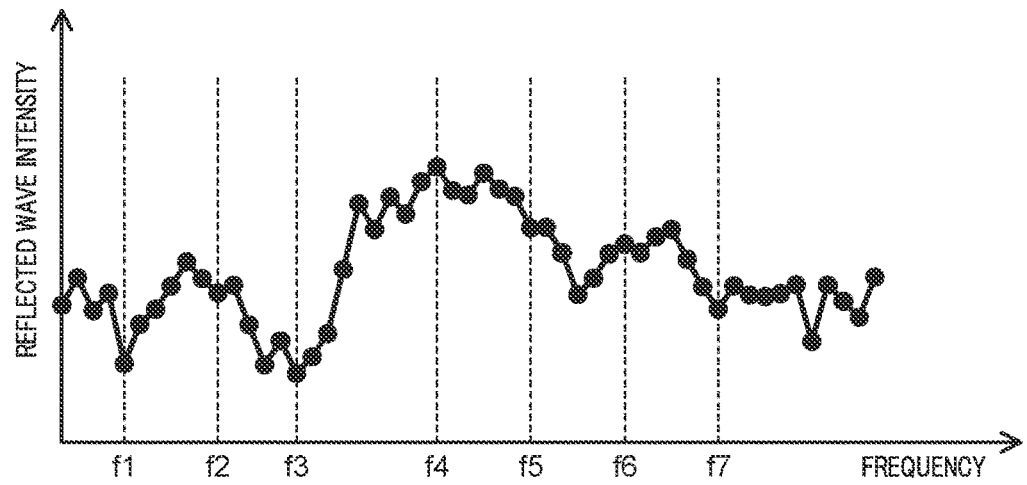
FIG. 8 is a diagram (2) illustrating a reflected wave spectrum of the tag according to the embodiment.

FIG. 8 is a diagram (2) illustrating a reflected wave spectrum of tag 1 according to the present embodiment. FIG. 8 illustrates a reflected wave spectrum in a case where the position or orientation of tag 1 with respect to reader 2 or an object around tag 1 changes from that in the case of FIG. 7. Although tag 1 is the same, valleys and peaks are hard to read. For example, the valley at frequency f5 in FIG. 7 cannot be read in FIG. 8. Further, the peaks at frequencies f2 and f6 in FIG. 7 are also hard to read.

Figure 9:
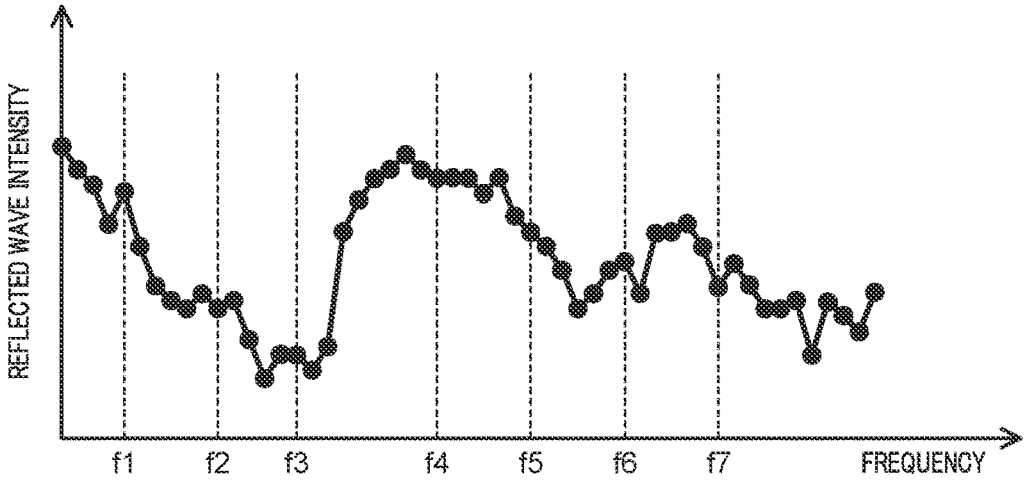
FIG. 9 is a diagram (3) illustrating a reflected wave spectrum of the tag according to the embodiment.

FIG. 9 is a diagram (3) illustrating a reflected wave spectrum of tag 1 according to the present embodiment. FIG. 9 illustrates a reflected wave spectrum in a case where the position or orientation of tag 1 with respect to reader 2 or an object around tag 1 further changes from that in FIG. 8. Valleys and peaks are harder to read than in FIG. 8.

As exemplified in FIGS. 7 to 9, a reflected wave spectrum of tag 1, even when tag 1 is the same, changes in a case where the position or orientation of tag 1, an object around tag 1, or the like changes. Under such a situation, the technique of estimating identification information of tag 1 by using the peak picking method generates erroneous identification. Given the above, RFID system U according to the present embodiment estimates identification information attached to tag 1 from an entire pattern of a reflected wave spectrum of tag 1 by using learning model Da, without performing processing of estimating a resonance frequency from a reflected wave spectrum of tag 1. Note that, the "entire pattern of a reflected wave spectrum of tag 1" here means reflection intensities at a plurality of frequency positions in the reflected wave spectrum of tag 1. RFID system U according to the present embodiment refers to information on reflection intensities at at least three frequency positions (for example, three frequency positions which hold a resonance frequency to be determined from design information of resonator 11 among the three frequency positions) so as to estimate identification information attached to tag 1.

«Configuration of Reader»

Figure 10:
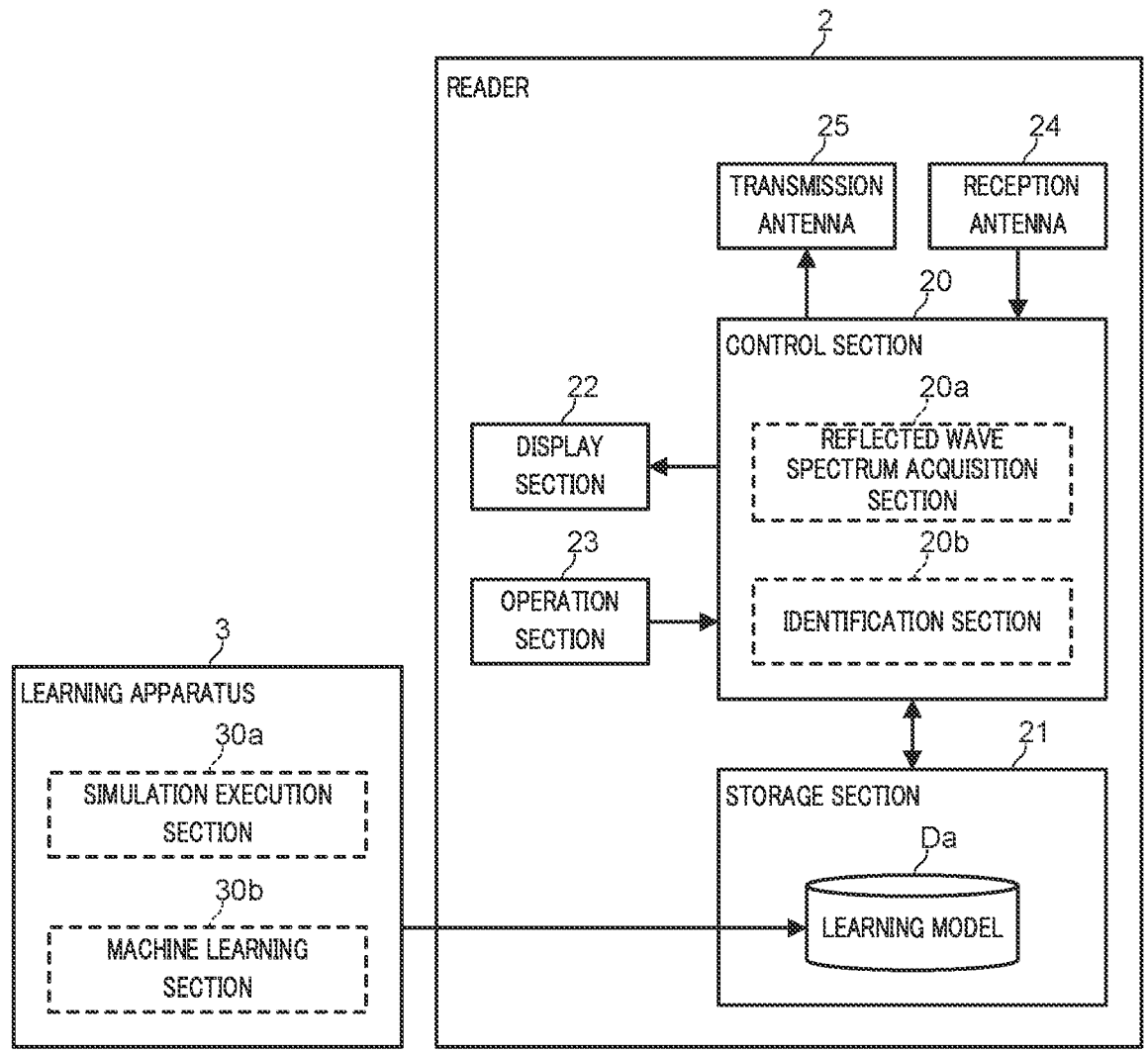
FIG. 10 illustrates functional configurations of a reader and a learning apparatus according to the embodiment.

FIG. 10 illustrates functional configurations of reader 2 and learning apparatus 3 according to the present embodiment. Note that, reader 2 is disposed installed at a position away from tag 1 by a few centimeters to a few meters so as to face the upper surface of tag 1 (the surface on a side on which resonator(s) 11 is/are formed), for example.

Reader 2 includes control section 20, storage section 21, display section 22, operation section 23, reception antenna 24, and transmission antenna 25.

Control section 20 is configured mainly of, for example, a well-known microcomputer including a CPU, a ROM, a RAM, and the like, and includes, in addition thereto, a driving circuit for generating a high-frequency driving signal to be transmitted to transmission antenna 25, a reception circuit for performing reception processing of a reflected wave signal from reception antenna 24, and the like. Note that, the driving circuit and the reception circuit of control section 20 may be integrally configured by a network analyzer.

Control section 20 includes reflected wave spectrum acquisition section 20a and identification section 20b.

Reflected wave spectrum acquisition section 20a emits an electromagnetic wave from transmission antenna 25 and receives a reflected wave from tag 1 at reception antenna 24 to generate reflected wave spectrum information of tag 1. Specifically, for example, reflected wave spectrum acquisition section 20a causes transmission antenna 25 to transmit an electromagnetic wave having a peak intensity at a single frequency. Then, reflected wave spectrum acquisition section 20a temporally changes the transmission frequency of the electromagnetic wave to be transmitted from transmission antenna 25, and performs a frequency sweep within a predetermined frequency band (for example, a band of 1 GHz to 10 GHz) set in advance. Then, reflected wave spectrum acquisition section 20a estimates the intensity and/or phase of a reflected wave from tag 1 received by reception antenna 24 at the time of each transmission frequency.

The frequency band in which a reflected wave spectrum is acquired is, for example, the HF band, the UHF band, the UWB frequency band (3.1 GHz to 10.6 GHz), the 24 GHz band, the millimeter wave band, or the like. Further, transmission frequencies are set in a stepwise manner for every bandwidth of at least 500 MHz or less, preferably for every bandwidth of 10 MHz, within the frequency band. This frequency band is typically set so as to include the resonance frequency of resonator 11 included in tag 1.

Note that, reflected wave spectrum acquisition section 20a may acquire the reflected wave spectrum information of tag 1 by using, instead of the sweeping method described above, an impulse method in which irradiation with electromagnetic waves having an estimated intensity profile in a predetermined frequency band is temporarily and collectively performed.

Identification section 20b estimates identification information of tag 1 from reflected wave spectrum information generated by reflected wave spectrum acquisition section 20a by using, for example, learning model Da on which machine training processing has been performed in advance by learning apparatus 3.

Learning model Da is a publicly-known classification learning model used in machine learning technology and is configured of, for example, at least one of a support vector machine (SVM), a k-nearest neighbor algorithm, a random forest, and/or a neural network. Note that, learning model Da may be expressed by a publicly-known kernel function.

Learning model Da is configured to be capable of estimating identification information of tag 1 from reflected wave intensities at a plurality of frequency positions in a reflected wave spectrum of tag 1, for example. That is, learning model Da estimates the identification information of tag 1 from a pattern of a reflected wave spectrum of tag 1, for example.

Here, as frequency positions of reflected wave intensities to be inputted to learning model Da, frequency positions for every bandwidth of at least 500 MHz or less, preferably for every bandwidth of 10 MHz or less within a frequency band in which a reflected wave spectrum is acquired are set. The frequency positions preferably include a resonance frequency in a standard state of resonator 11 of tag 1 or a frequency near the resonance frequency. Note that, frequency positions of reflected wave intensities to be inputted to learning model Da are typically the same frequency positions as frequency positions to which reference is made when training processing is performed on learning model Da.

Note that, the reflected wave spectrum information may be information on the intensity itself of a reflected wave for each frequency or may be an intensity ratio between the intensity of a transmission wave and the intensity of a reflected wave. Further, the reflected wave spectrum information to be inputted to learning model Da may include information on a phase characteristic in addition to or instead of information on an amplitude characteristic for each frequency.

Storage section 21 is configured of a read only memory (ROM), a random access memory (RAM), a flash memory, and the like, and stores learning model Da on which training processing has been performed in advance by learning apparatus 3.

Operation input section 22 includes various switches such as an irradiation switch for transmitting an electromagnetic wave, receives various input operations by the user, and outputs an operation signal to control section 20.

Display section 22 is configured of, for example, a liquid crystal display. Display section 22 displays various operation screens and identification information configured in tag 1 in accordance with a display control signal inputted from control section 20.

«Configuration of Learning Apparatus»

Learning apparatus 3 performs training processing by machine learning on learning model Da to be used by reader 2.

This type of learning model Da is autonomously optimized by performing training processing thereon so as to be capable of extracting a feature of a pattern to be identified and precisely identifying a pattern to be identified even from data in which noise or the like is superimposed. In this regard, the reflected wave spectrum of tag 1 draws a unique pattern for each identification information because identification information of tag 1 is typically set by using as a reference an appearance aspect(s) of a resonance peak(s) appearing in a reflected wave spectrum (for example, the position(s) of the resonance peak(s), the number of resonance peaks, or an inter-peak interval among a plurality of resonance peaks). That is, by performing training processing on this type of learning model Da with, as training data, a reflected wave spectrum whose identification information is used as a label, learning model Da can estimate, when a certain reflected wave spectrum is inputted, the most similar reflected wave spectrum (that is, identification information corresponding to the reflected wave spectrum) among reflected wave spectra for every identification information used as the training data.

In particular, at this time, by preparing training data even for various reflected wave spectra which assume various situation changes in which an object around tag 1, an ambient environment of tag 1, a position or orientation of tag 1, or the like differs, and by performing training processing on learning model Da by using these various reflected wave spectra, learning model Da can output appropriate identification information even in a case where the reflected wave spectrum of tag 1 changes as in FIGS. 8 and 9.

Learning apparatus 3 is configured based on such a technical idea, and includes: simulation execution section 30*a* that generates various reflected wave spectra of tag 1 which assume various situation changes; and machine learning section 30*b* that performs machine learning on learning model Da by using the reflected wave spectra generated by simulation execution section 30*a*. Note that, learning apparatus 3 is a well-known computer configured to include a central processing unit (CPU), a read only memory (ROM), a random access memory (RAM), an input port, an output port, and the like, for example.

Figure 11:
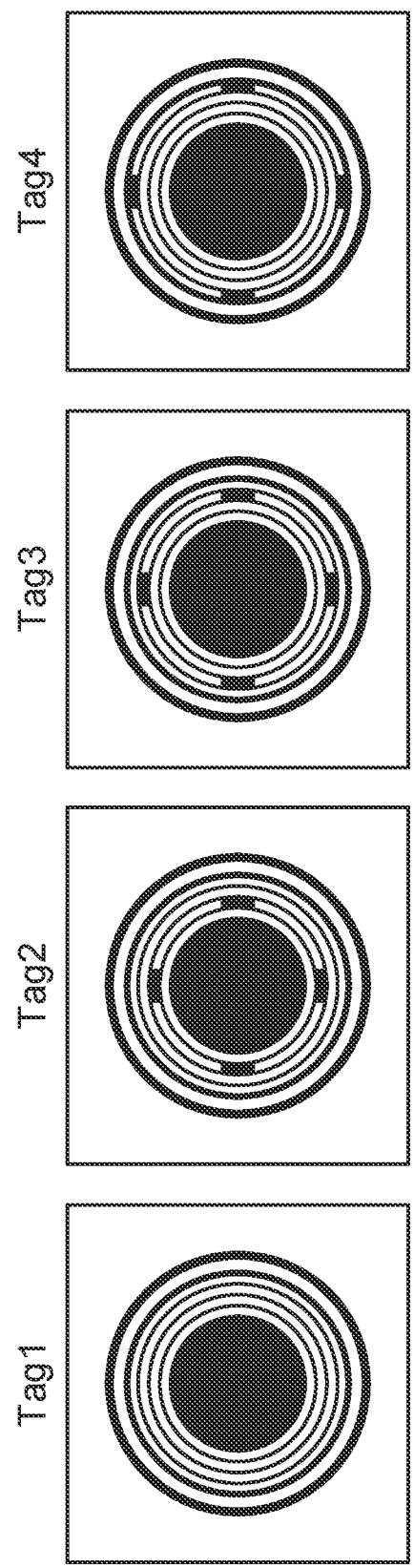
FIG. 11 illustrates examples of an operation of a simulation execution section according to the embodiment.
Figure 12:
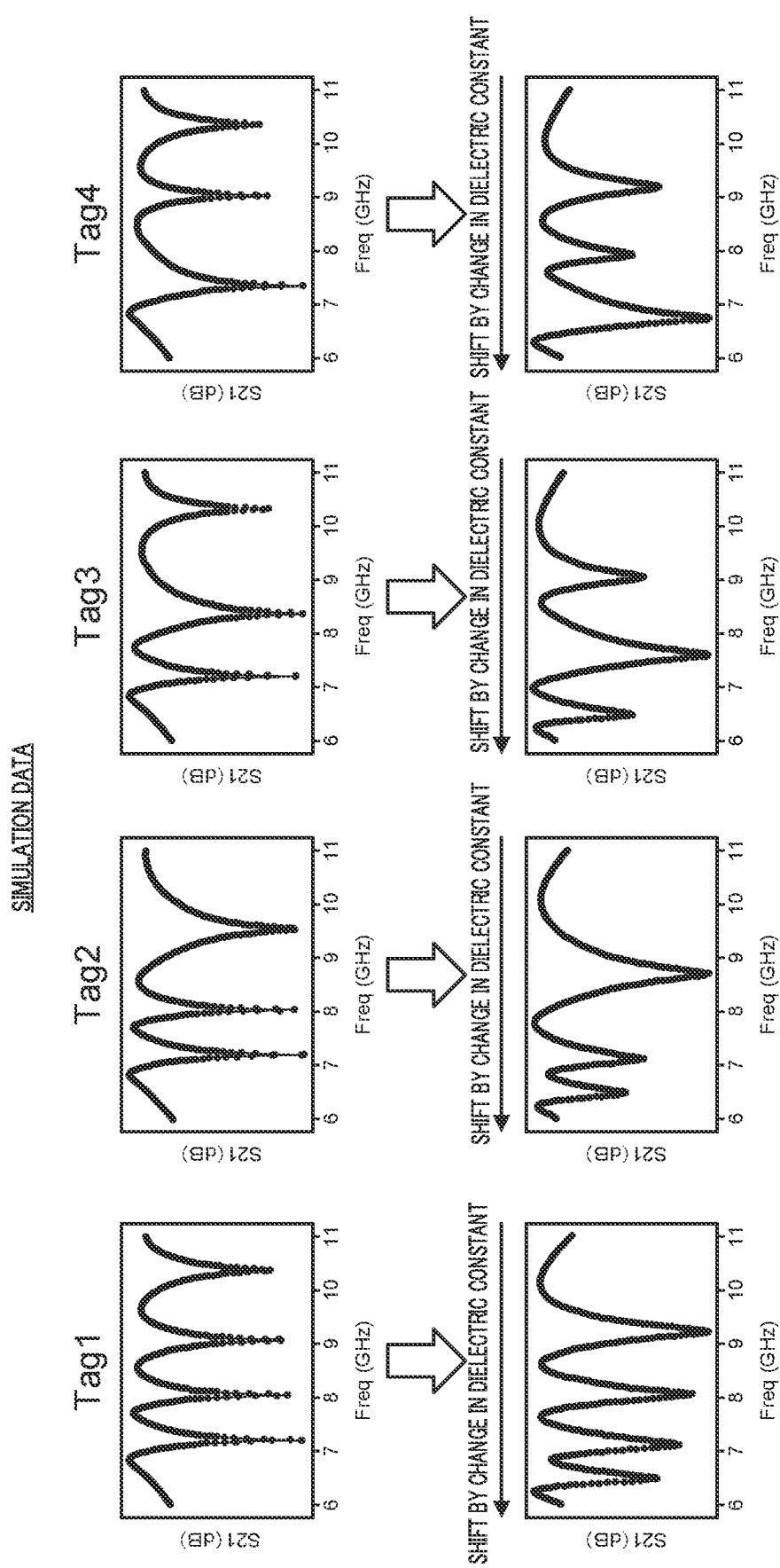
FIG. 12 illustrates examples of the operation of the simulation execution section according to the embodiment.

FIGS. 11 and 12 illustrate examples of an operation of simulation execution section 30*a* according to the present embodiment.

FIG. 11 indicates four types of tag 1 (Tags 1, 2, 3, and 4) in which pieces of identification information to be attached differ from each other. Note that, Tag 1 is tag 1 including four resonators 11 that are concentrically arranged. Tags 2, 3, and 4 are tag 1 in which the structure of Tag 1 is modified and one of four resonators 11 is in a state of not functioning by conductively connecting conductor sections having an annular shape with each other. The reflected wave spectra of Tags 1, 2, 3, and 4 are identifiable based on the positions and number of four or three resonance peaks appearing in each reflected wave spectrum.

FIG. 12 indicates reflected wave spectra of the four types of tag 1 (Tags 1, 2, 3, and 4) generated by simulation execution section 30*a*, respectively. Note that, the reflected wave spectra in the upper column of FIG. 12 are reflected wave spectra acquired under conditions assumed in actual use of the four types of tag 1 (Tags 1, 2, 3, and 4), respectively, and the reflected wave spectra in the lower column of FIG. 12 are reflected wave spectra acquired when the dielectric constant of base material 11*a* is changed in the four types of tag 1 (Tags 1, 2, 3, and 4), respectively.

As illustrated in FIG. 11, simulation execution section 30*a* determines, by using electromagnetic field analysis simulation (for example, an FDTD method), the reflected wave spectrum of tag 1 when an electromagnetic wave is emitted from reader 2 to tag 1 for each of the plurality of types of tag 1 in which pieces of identification information to be attached differ from each other. Then, simulation execution section 30*a* attaches labels according to identification information of tag 1 (here, a label indicating to which of Tag 1, 2, 3, or 4 tag 1 the label corresponds) to the reflected wave spectra determined by the electromagnetic field analysis simulation, and outputs the reflected wave spectra as training data.

Here, simulation execution section 30*a* generates a plurality of reflected wave spectra, which is caused to belong to identical identification information, by variously changing, from a reference parameter, at least one of a parameter defining a structure or a material of tag 1, a parameter defining a state of a surrounding environment of tag 1, and/or a parameter defining a measurement condition when identification information of tag 1 is estimated, more preferably each of these parameters. The reference parameter is a standard parameter assumed when tag 1 is actually used, and the reflected wave spectrum generated after performing the parameter change processing described above can be said to be a reflected wave spectrum to be acquired under a condition deviating from the standard parameter.

However, since tag 1 basically configures identification information by a pattern of a resonance peak appearing in a reflected wave spectrum, the parameter to be changed by simulation execution section 30*a* is typically a parameter other than the parameter that defines the shape of resonator 11 of tag 1. Thus, when reflected wave spectra under various situations are generated, a circumstance in which reflected wave spectra to which pieces of identification information different from each other are caused to belong resemble each other is restrained.

With respect to classification processing using learning model Da, appropriate classification processing is only performed in an interpolation area of training data used at the time of the construction of learning model Da. In this regard, it can also be said that the interpolation area thereof is enlarged by using, as training data, a plurality of reflected wave spectra obtained by variously performing condition changes.

As specific examples of the parameters to be changed by simulation execution section 30*a*, the following parameters can be mentioned.

Firstly, a parameter according to a disposition or shape of an ingredient configuring tag 1 can be mentioned. When tag 1 is actually used, base material 11*a* may be deformed or a surrounding conductor of resonator 11 may partially peel off. In this regard, by using, as training data, various reflected wave spectra obtained when such a parameter is changed, it is possible to construct learning model Da having robustness against deformation of base material 11*a* or the like.

Secondly, a conductivity of an ingredient configuring tag 1 can be mentioned. When tag 1 is actually used, the conductivity of a conductive ingredient configuring resonator 11 may change due to oxidization of a conductive member, attachment of a foreign matter, or the like. In this regard, by using, as training data, various reflected wave spectra obtained when such a parameter is changed, it is possible to construct learning model Da having robustness against a change in the conductivity of a conductive member.

Thirdly, a dielectric constant or dielectric loss tangent of a surrounding environment of tag 1 can be mentioned. When tag 1 is actually used, the dielectric constant or dielectric loss tangent around resonator 11 may change due to water being contained in base material 11*a*, a change in the humidity around tag 1, or the like. In this regard, by using, as training data, various reflected wave spectra obtained when such a parameter is changed, it is possible to construct learning model Da having robustness against a change in the dielectric constant or dielectric loss tangent of a surrounding environment of tag 1.

Fourthly, a position of reader 2 with respect to tag 1 can be mentioned. When tag 1 is actually used, tag 1 may present at a position inclined with respect to reader 2 or the distance between tag 1 and reader 2 may be larger than a distance assumed at the time of designing. In this regard, by using, as training data, various reflected wave spectra obtained when such a parameter is changed, it is possible to construct learning model Da having robustness against a change in a distance between an identification target and reader 2, generation of a state in which an identification target is inclined with respect to reader 2, or the like.

Fifthly, a presence position of an object (for example, an electromagnetic wave reflector) present around tag 1 can be mentioned. When tag 1 is actually used, there may be an object that reflects an electromagnetic wave transmitted from reader 2. In this regard, by using, as training data, various reflected wave spectra obtained when such a parameter is changed, it is possible to construct learning model Da having robustness against a change in an object present around tag 1.

Here, in a case where there is a plurality of types of the parameters to be changed from the reference parameter, simulation execution section 30*a* typically generates reflected wave spectra for every combination of the respective parameters after and before changing the plurality of types. Thus, it is possible to further enhance the robustness against a situation change during actual use.

Further, when simulation execution section 30*a* obtains a plurality of reflected wave spectra by variously changing a parameter(s) in each tag 1, the type(s) of a parameter(s) to be changed and the value(s) of the changed parameter(s) in every tag 1 are preferably the same. Thus, it is possible to restrain only an interpolation area of certain tag 1 from being enlarged and to restrain erroneous identification from being induced.

FIG. 13 illustrates examples of parameters to be changed by simulation execution section 30*a*. FIG. 13 indicates an aspect of changing, for each of the four kinds of tag 1, four parameters of the conductivity of a conductive member configuring resonator 11, the dielectric constant of base material 11*a*, the dielectric loss tangent (tan δ) of base material 11*a*, and the distance between tag 1 and reader 2.

Specifically, simulation execution section 30*a* determines reflected wave spectra when the conductivity of the conductive member configuring resonator 11 is, for example, four values of $3.77 \times 10^{-7}$, $2.5 \times 10^{-7}$, $2.0 \times 10^{-7}$, and $1.66 \times 10^{-7}$ (the unit here is [S/m]), respectively, determines reflected wave spectra when the relative dielectric constant of base material 11*a* is, for example, four values of 1, 2, 3, and 4, respectively, determines reflected wave spectra when the dielectric loss tangent (tan δ) of base material 11*a* is, for example, four values of 0.0001, 0.001, 0.01, and 0.1, respectively, and determines reflected wave spectra when the distance between tag 1 and reader 2 is, for example, four values of 1, 3, 5, and 7 (the unit here is [cm]). That is, simulation execution section 30*a* performs electromagnetic field analysis simulation under conditions of 4×4×4×4=256 patterns to generate reflected wave spectra of tag 1. Further, simulation execution section 30*a* performs, for each of the four types of tag 1, electromagnetic field analysis simulation under the same conditions of 256 patterns to generate a reflected wave spectrum of tag 1.

Machine learning section 30*b* performs training processing by machine learning on learning model Da by using training data in which the reflected wave spectrum determined by simulation execution section 30*a* and identification information of tag 1 are configured as a set, where the identification information is attached to the reflected wave spectrum. At this time, machine learning section 30*b* performs training processing by machine learning on learning model Da by using, as the training data, each of the plurality of reflected wave spectra which has been determined by simulation execution section 30*a* and is associated with each tag 1. Note that, in the aspect of FIG. 13, reflected wave spectra of 256 patterns are generated as the training data for each of the four types of tag 1 (Tags 1, 2, 3, and 4), and machine learning section 30*b* performs training processing using the reflected wave spectra of 256 patterns on learning model Da for each of the four types of tag 1.

Note that, in this case, a hyperparameter of learning model Da may be optimized by at least one of grid search, random search, and/or Bayesian optimization As described above, training processing is performed on learning model Da such that identification information of tag 1 can be estimated from reflected wave intensities at a plurality of frequency positions in a reflected wave spectrum of tag 1, for example. Here, reflected wave intensities at a plurality of frequency positions to be inputted to learning model Da are reflected wave intensities at frequency positions for every bandwidth of at least 500 MHz or less, preferably for every bandwidth of 10 MHz or less, within a frequency band in which reflected wave spectrum data is acquired. The frequency positions preferably include a resonance frequency of resonator 12 included in tag 1 or a frequency near the resonance frequency. The number of frequency positions to be inputted to learning model Da is typically set to be larger than the number of attributes of tag 1. For example, when identification information of tag 1 is regarded as bit information and each bit is regarded as one attribute, the number of frequency positions to be inputted to learning model Da is configured to be larger than the bit length. For example, when the identification information is 8 bits, the number of the frequency positions is configured to be larger than 8.

«Operation of RFID system»

Figure 14:
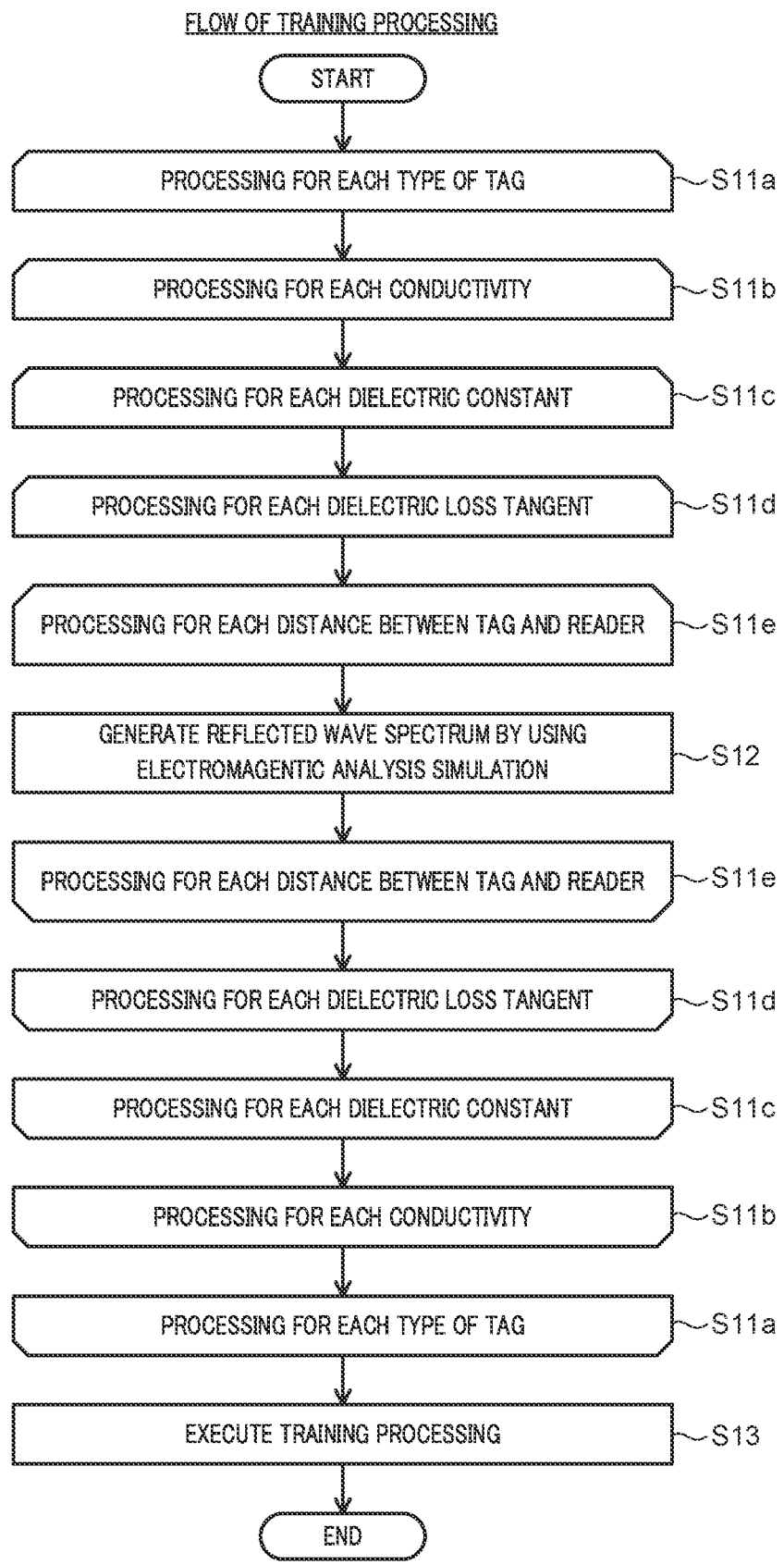
FIG. 14 is a flowchart illustrating an example of an operation of the learning apparatus according to the embodiment.

FIG. 14 is a flowchart illustrating an example of an operation of learning apparatus 3 according to the present embodiment.

In this flowchart, learning apparatus 3 (simulation execution section 30*a*) calculates, by electromagnetic field analysis simulation, a reflected wave spectrum of tag 1 by variously changing conditions in loop processing in step S11*a*, loop processing in step S11*b*, loop processing in step S11*c*, loop processing in step S11*d*, and loop processing in step S11*e* (step S12).

Here, the loop processing in step S11*a* is loop processing of calculating a reflected wave spectrum for each tag 1 in which pieces of identification information to be attached differ. In this loop processing, for example, in a case where there are four types of tag 1 desired to be identified, reflected wave spectra will be calculated for the four types of tag 1, respectively.

Further, the loop processing in step S11*b* is processing of calculating a reflected wave spectrum for each conductivity of the conductive member configuring resonator 11 of tag 1 (for example, for each conductivity indicated in FIG. 13).

Further, the loop processing in step S11*c* is loop processing of calculating a reflected wave spectrum for each relative dielectric constant of base material 11*a* of tag 1 (for example, for each relative dielectric constant indicated in FIG. 13).

Further, the loop processing in step S11d is loop processing of calculating a reflected wave spectrum for each dielectric loss tangent of base material 11a of tag 1 (for example, for each dielectric loss tangent indicated in FIG. 13).

Further, the loop processing in step S11e is loop processing of calculating a reflected wave spectrum for each distance between tag 1 and reader 2 (for example, for each distance indicated in FIG. 13).

After each loop processing in steps S11a, S11b, S11c, S11d, and S11e is completed, learning apparatus 3 (machine learning section 30b) performs, with these reflected wave spectra as training data, training processing on learning model Da by using a publicly-known machine learning algorithm (step S13).

After performing machine learning on learning model Da by such processing, learning apparatus 3 transmits learning model Da, which has been already trained, to reader 2.

Figure 15:
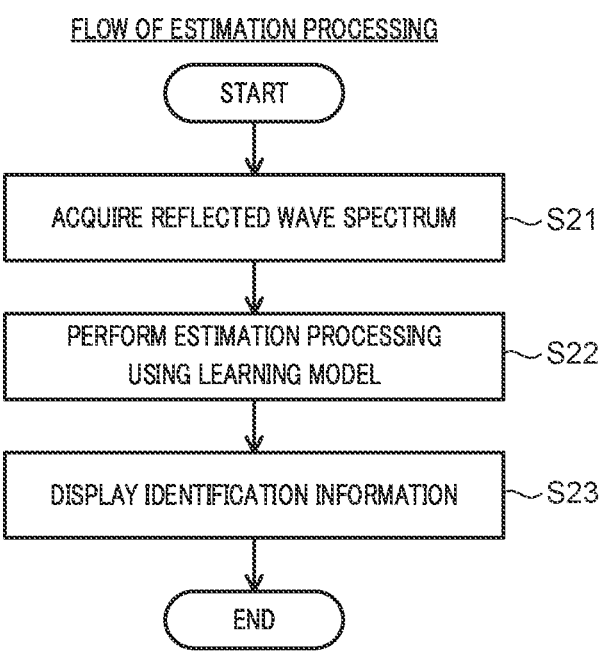
FIG. 15 is a flowchart illustrating an example of an operation of the reader according to the embodiment.

FIG. 15 is a flowchart illustrating an example of an operation of reader 2 according to the present embodiment. Note that, the flowchart in FIG. 15 indicates the operation when, after training processing is performed on learning model Da, RFID system U operates when identification information of tag 1 is actually estimated using learning model Da which has been already trained.

In step S21, reader 2 (reflected wave spectrum acquisition section 20a) emits electromagnetic waves from transmission antenna 25 while changing the transmission frequency and receives reflected waves at reception antenna 24 to acquire a reflected wave spectrum of tag 1.

In step S22, reader 2 (identification section 20b) executes estimation processing on the reflected wave spectrum of tag 1. Specifically, reader 2 inputs reflected wave spectrum information of tag 1 to learning model Da and acquires identification information of tag 1 as an output. Note that, in a case where learning model Da outputs a plurality of pieces of identification information, identification section 20b acquires the most probable piece of identification information.

In step S23, reader 2 (identification section 20b) displays the identification information of tag 1 as an estimation result on display section 22.

Figure 16:
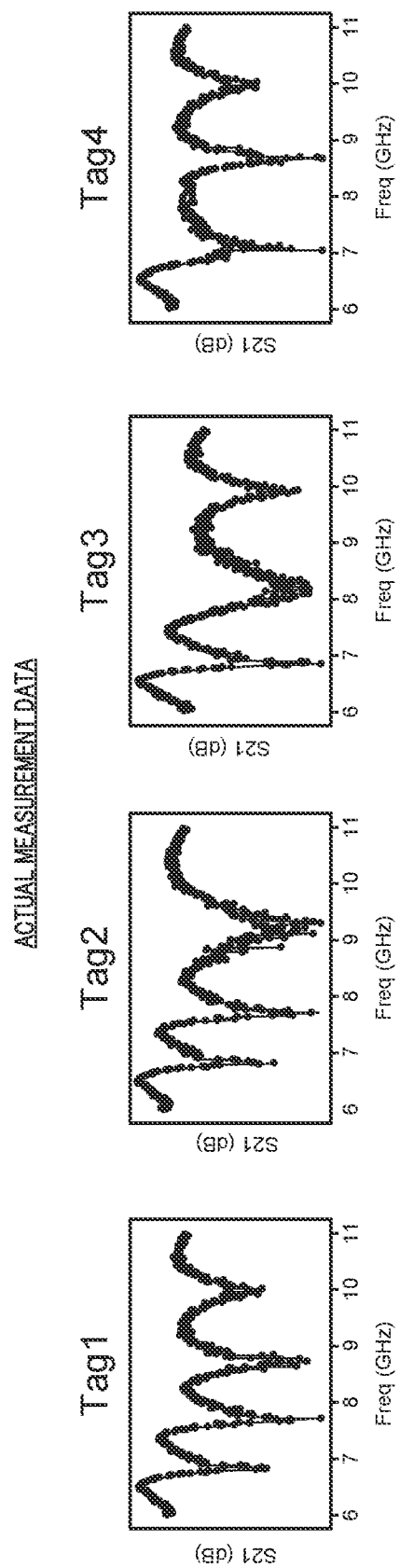
FIG. 16 illustrates experimental results of verifying identification accuracy of a learning model on which training processing has been performed in accordance with the flowchart in FIG. 15.

FIG. 16 illustrates experimental results of verifying identification accuracy of learning model Da on which training processing has been performed in accordance with the flowchart in FIG. 15. In FIG. 16, reader 2 acquired each reflected wave spectrum information of the four types of tag 1 (Tags 1, 2, 3, and 4) in FIG. 11, and verified whether each of the four types of tag 1 could be identified from each reflected wave spectrum information of the four types of tag 1. As a result, although the respective reflected wave spectra of the four types of tag 1 (Tags 1, 2, 3, and 4) drew patterns slightly different from reflected wave spectra determined by simulation, each of the four types of tag 1 could be identified precisely.

[Effects]

As described above, when an identification target (tag 1 here) is actually used, learning apparatus 3 according to the present embodiment makes it possible to construct learning model Da which is capable of identifying an attribute of the identification target (here, identification information of tag 1) with high accuracy and has robustness even in a case where a measurement condition or the like when a structure or a material of the identification target, an object present around the identification target, or the attribute of the identification target is identified is a situation different from an experimental condition. In other words, it is possible to construct learning model Da having robustness against even various situation changes during actual use.

(Variation 1)

Machine learning section 30b may perform preprocessing of noise superimposition on a reflected wave spectrum of tag 1 determined by simulation execution section 30a, and then may perform training processing by machine learning on learning model Da by using, as training data, the reflected wave spectrum after the preprocessing.

Figure 17:
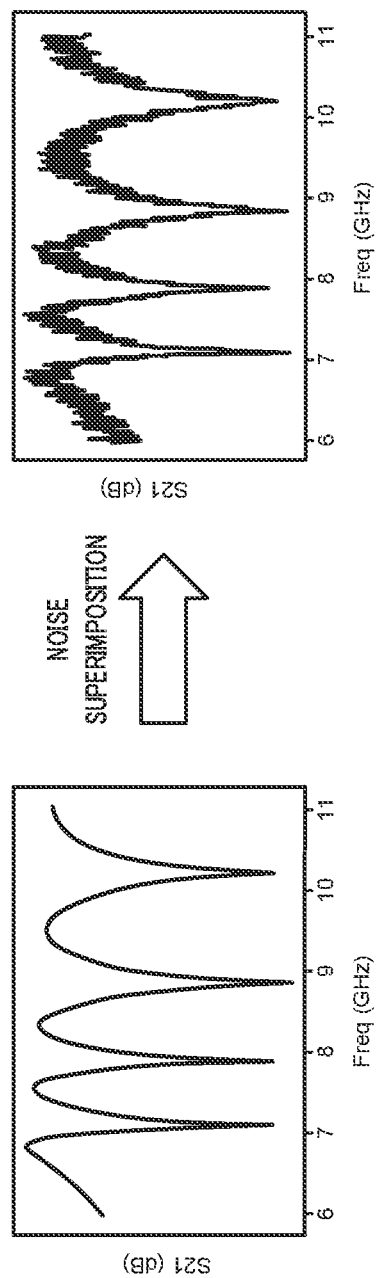
FIG. 17 illustrates an example of a reflected wave spectrum obtained by performing preprocessing of noise superimposition on a reflected wave spectrum determined by the simulation execution section in Variation 1.

FIG. 17 illustrates an example of a reflected wave spectrum obtained by performing preprocessing of noise superimposition on a reflected wave spectrum determined by simulation execution section 30a.

The preprocessing of noise superimposition may be any publicly-known and arbitrary technique. For example, machine learning section 30b calculates a noise component by utilizing a pseudo-random number for each frequency position, and performs processing of adding or subtracting the noise component with respect to an intensity for each frequency position in a reflected wave spectrum to generate a reflected wave spectrum for training data.

Thus, the present variation makes it possible to construct learning model Da having robustness against noise generated during actual measurement.

(Variation 2)

Machine learning section 30b may perform preprocessing for normalization on a reflected wave spectrum of tag 1 determined by simulation execution section 30a, and then may perform training processing by machine learning on learning model Da by using, as training data, the reflected wave spectrum after the preprocessing.

A plurality of reflected wave spectra determined under various conditions may differ from each other in the scale of reflected wave intensity. In order to eliminate such an element unrelated to a pattern of a reflected wave spectrum configuring identification information, machine learning section 30b performs, for example, preprocessing for normalization according to standardization or value parallel movement, and then uses, as training data, the reflected wave spectrum after the preprocessing.

Thus, the present variation makes it possible to construct learning model Da that is more accurate.

(Variation 3)

Machine learning section 30b may perform training processing by machine learning on a learning model by using both a reflected wave spectrum of tag 1 determined by simulation execution section 30a and a reflected wave spectrum of tag 1 obtained by an actual measurement as training data. The reflected wave spectrum of tag 1 obtained by an actual measurement may be a reflected wave spectrum obtained under an environment in which tag 1 is actually used, or may be a reflected wave spectrum obtained under an experimental environment.

The reflected wave spectrum of tag 1 obtained by an actual measurement may include information, such as a way of noise superimposition, that cannot be assumed in electromagnetic field simulation.

In this regard, it is possible to construct learning model Da having higher robustness by performing training processing by machine learning on a learning model by using both a reflected wave spectrum of tag 1 determined by simulation execution section 30a and a reflected wave spectrum of tag 1 obtained by an actual measurement as training data as in the present variation.

(Variation 4)

In the embodiment described above, an aspect using information on a reflected wave intensity for each frequency position as reflected wave spectrum information configuring identification information of tag 1 has been indicated.

However, the reflected wave spectrum information configuring identification information of tag 1 may be, for example, information on a reflected wave intensity based on an elapsed time since reader 2 starts frequency sweeping. Further, as the reflected wave spectrum information configuring identification information of tag 1, information on a phase characteristic for each frequency position (for example, a characteristic of a phase difference between a transmission wave and a reflected wave) may also be used.

(Variation 5)

In the embodiment described above, an example in which learning apparatus 3 of the present disclosure is applied to RFID system U for chipless-RFID tag 1 has been indicated. However, learning apparatus 3 of the present disclosure is also applicable to an RFID system for an RFID sensor instead of RFID system U for chipless-RFID tag 1.

Figure 18:
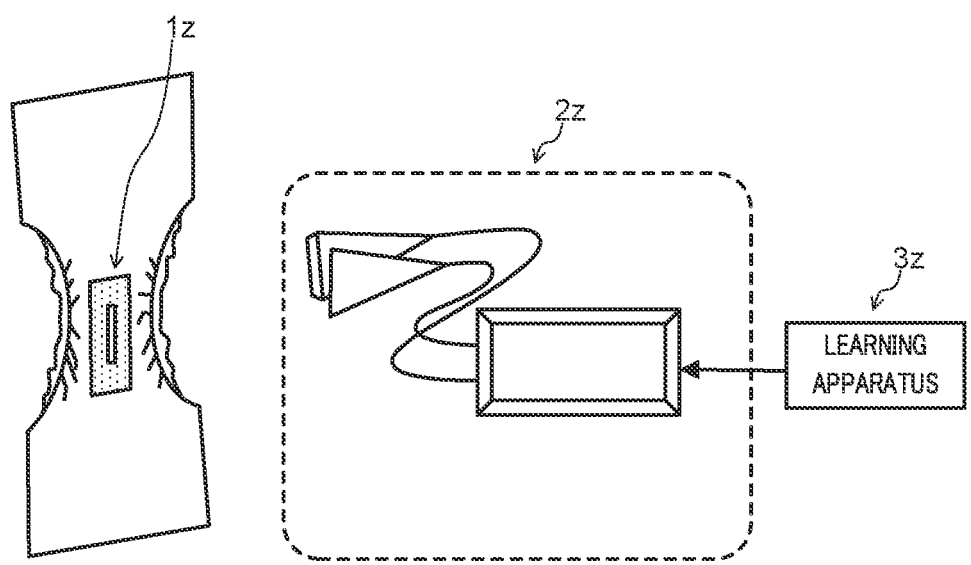
FIG. 18 illustrates an entire configuration of an RFID system for an RFID sensor according to Variation 5.

FIG. 18 illustrates an entire configuration of RFID system Uz for RFID sensor 1z according to Variation 5. Here, RFID sensor 1z is used for detecting a water amount of a diaper.

RFID sensor 1z includes a resonator that is physically associated with a state of a detection target. Here, it is configured, for example, that a change in the water amount of the diaper leads to a change in the dielectric constant around the resonator of RFID sensor 1z and to a change in the peak position of the resonance peak of RFID sensor 1z.

Reader 2z captures a change in a pattern of a reflected wave spectrum of RFID sensor 1z in accordance with a state change in a detection target (for example, a change in the resonance peak position, a change in the resonance peak intensity, or a change in the signal intensity of a baseband), thereby detecting a state change in the detection target (for example, see PTLs 2 and 3). That is, reader 2z detects the state of the detection target as identification information of RFID sensor 1z. At this time, as described in the foregoing embodiment, reader 2z identifies identification information of RFID sensor 1z (that is, the state of the detection target) by using, at learning apparatus 3z, learning model Da on which training processing has been performed based on a reflected wave spectrum for each state of the detection target.

When generating a reflected wave spectrum for each state of a detection target, learning apparatus 3z generates a plurality of reflected wave spectra, which is caused to belong to identical identification information (that is, the state of the detection target), by variously changing, from a reference parameter, a parameter defining a structure or a material of RFID sensor 1z, a parameter defining a state of a surrounding environment of RFID sensor 1z, a parameter defining a measurement condition when identification information of RFID sensor 1z is identified, or the like. Then, as described in the foregoing embodiment, learning apparatus 3z performs training processing on learning model Da by using these reflected wave spectra.

As described above, learning apparatus 3z according to the present embodiment makes it possible to cause learning model Da, which is used to detect a state change, to have robustness in RFID system Uz for RFID sensor 1z.

Note that, although a change in the water content of an ambient object has been mentioned here as an example of a state change to be detected by RFID sensor 1z, a state change to be detected by RFID sensor 1z may be arbitrary such as a change in the position of an ambient object, a change in the morphology of an ambient object, a change in the humidity of an ambient environment, a change in the temperature of an ambient environment, a change in the gas concentration of an ambient environment, a change in the light illuminance of an ambient environment, a change in the pH of an ambient environment, a change in the magnetic field of an ambient environment, or a change in the degree of oxidization of an ambient object.

Other Embodiments

In the embodiment described above, an aspect in which reader 2 and learning apparatus 3 are configured as separate bodies has been indicated as an example of RFID system U. However, reader 2 and learning apparatus 3 may be integrally configured. That is, reader 2 may have the function of learning apparatus 3.

Although specific examples of the present invention have been described in detail above, these are merely examples and do not limit the scope of claims. The technology described in the scope of claims includes various modifications and changes of the specific examples exemplified above.

The disclosure of Japanese Patent Application No. 2020-090737, filed on May 25, 2020, including the specification, drawings and abstract, is incorporated herein by reference in its entirety.

INDUSTRIAL APPLICABILITY

The learning apparatus according to the present disclosure makes it possible to construct a learning model which has high robustness against various changes during actual use and is capable of realizing identification performance with high accuracy.

REFERENCE SIGNS LIST

U, Uz RFID system
1,1z Tag
11a Base material
11 Resonator
2, 2z Reader
20 Control section
20a Reflected wave spectrum acquisition section
20b Identification section
21 Storage section
22 Display section
23 Operation section
24 Reception antenna
25 Transmission antenna
3 Learning apparatus
30a Simulation execution section
30b Machine learning section
Da Learning model

The invention claimed is:

1. A learning apparatus of a learning model for performing attribute identification of an identification target, the identification target indicating an attribute of the identification target by an electromagnetic wave reflection characteristic, the learning apparatus comprising:
a hardware processor programmed to:
determine, by using electromagnetic field analysis simulation, a reflected wave spectrum obtained when an electromagnetic wave is emitted from a reader to the identification target; and
perform training processing by machine learning on the learning model by using training data in which the reflected wave spectrum and the attribute of the identification target are configured as a set, the attribute being attached to the reflected wave spectrum, wherein the hardware processor generates a plurality of the reflected wave spectra by variously changing, from a reference parameter, at least one of a parameter defining a structure or a material of the identification target, a parameter defining a state of a surrounding environment of the identification target, and/or a parameter defining a measurement condition when the attribute of the identification target is estimated, the plurality of reflected wave spectra being caused to belong to the attribute that is identical, and performs the training processing by the machine learning on the learning model by using, as the training data, the plurality of reflected wave spectra obtained for each of a plurality of the attributes, wherein the identification target includes at least one resonator, and the attribute of the identification target is identifiable by an appearance aspect of a resonance peak appearing in the reflected wave spectrum.

2. The learning apparatus according to claim 1, wherein the reference parameter is a parameter assumed when the identification target is actually used.

3. The learning apparatus according to claim 1, wherein the parameter defining the structure of the identification target includes a parameter defining a disposition or shape of an ingredient configuring the identification target.

4. The learning apparatus according to claim 1, wherein the parameter defining the material of the identification target includes a conductivity of an ingredient configuring the identification target.

5. The learning apparatus according to claim 1, wherein a parameter of the surrounding environment of the identification target includes a dielectric constant or dielectric loss tangent of the surrounding environment of the identification target.

6. The learning apparatus according to claim 1, wherein a parameter according to the measurement condition when the attribute of the identification target is identified includes a position of the reader with respect to the identification target.

7. The learning apparatus according to claim 1, wherein a parameter according to the measurement condition when the attribute of the identification target is identified includes a presence position of an object present around the identification target.

8. The learning apparatus according to claim 1, wherein the hardware processor generates a plurality of the reflected wave spectra by variously changing, from the reference parameter, each of the parameter defining the structure or the material of the identification target, the parameter defining the state of the surrounding environment of the identification target, and a parameter defining the measurement condition when the attribute of the identification target is identified, the plurality of reflected wave spectra being caused to belong to the attribute that is identical.

9. The learning apparatus according to claim 1, wherein in a case where there is a plurality of types of the parameters to be changed from the reference parameter, the hardware processor generates the plurality of reflected wave spectra for every combination of the plurality of parameters after and before changing the plurality of types, respectively.

10. The learning apparatus according to claim 1, wherein the hardware processor performs preprocessing of noise superimposition on the reflected wave spectrum determined by the hardware processor and then performs the training processing by the machine learning on the learning model by using, as the training data, the reflected wave spectrum after the preprocessing.

11. The learning apparatus according to claim 1, wherein the hardware processor performs preprocessing for normalization on the reflected wave spectrum determined by the hardware processor and then performs the training processing by the machine learning on the learning model by using, as the training data, the reflected wave spectrum after the preprocessing.

12. The learning apparatus according to claim 1, wherein the learning model is configured by at least one of a support vector machine (SVM), a k-nearest neighbor algorithm, a random forest, and/or a neural network.

13. The learning apparatus according to claim 1, wherein a hyperparameter of the learning model is optimized by using at least one of grid search, random search, and/or Bayesian optimization.

14. The learning apparatus according to claim 1, wherein the training data includes the reflected wave spectrum of the identification target determined by the hardware processor and the reflected wave spectrum of the identification target obtained by an actual measurement.

15. The learning apparatus according to claim 1, wherein:
the identification target is a chipless-RFID tag, and
the attribute of the identification target is identification information of the chipless-RFID tag, the identification information being estimated from the reflected wave spectrum.

16. The learning apparatus according to claim 1, wherein:
the identification target is an RFID sensor, and
the attribute of the identification target is a state of a surrounding object or the surrounding environment to be detected by the RFID sensor, the state being estimated from the reflected wave spectrum.

17. The learning apparatus according to claim 1, wherein the reflected wave spectrum includes information on an intensity of a reflected wave obtained when the electromagnetic wave is emitted from the reader to the identification target and/or information on a phase difference between a transmission wave and the reflected wave.

18. A reader that performs attribute identification of an identification target, the identification target indicating an attribute of the identification target by an electromagnetic wave reflection characteristic, the reader comprising:
an acquisition section that emits an electromagnetic wave to the identification target and acquires a reflected wave spectrum of the identification target from a reflected wave of the electromagnetic wave; and
a hardware processor that identifies, by using the learning model generated by the learning apparatus according to claim 1, the attribute of the identification target from the reflected wave spectrum acquired by the acquisition section.

19. The learning apparatus according to claim 1, wherein the hardware processor performs the preprocessing of noise superimposition on the reflected wave spectrum using a pseudo-random number for each frequency position.

20. A non-transitory recording medium storing a computer-readable learning program that performs training processing on a learning model for performing attribute identification of an identification target, the identification target indicating an attribute of the identification target by an electromagnetic wave reflection characteristic, the learning program comprising:
first processing of determining, by using electromagnetic field analysis simulation, a reflected wave spectrum obtained when an electromagnetic wave is emitted from a reader to the identification target; and second processing of performing training processing by machine learning on the learning model by using training data in which the reflected wave spectrum determined by the first processing and the attribute of the identification target are configured as a set, the attribute being attached to the reflected wave spectrum, wherein in the first processing, a plurality of the reflected wave spectra is generated by variously changing, from a reference parameter, at least one of a parameter defining a structure or a material of the identification target, a parameter defining a state of a surrounding environment of the identification target, and/or a parameter defining a measurement condition when the attribute of the identification target is identified, the plurality of reflected wave spectra being caused to belong to the attribute that is identical, and in the second processing, the training processing by the machine learning is performed on the learning model by using, as the training data, the plurality of reflected wave spectra obtained for each of a plurality of the attributes, wherein the identification target includes at least one resonator, and the attribute of the identification target is identifiable by an appearance aspect of a resonance peak appearing in the reflected wave spectrum.

* * * * *